US012665886B2

(12) United States Patent
Kim et al.

(10) Patent No.: US 12,665,886 B2
(45) Date of Patent: Jun. 23, 2026

(54) PRIVACY-PRESERVING DISTRIBUTED COMPUTING

(71) Applicant: Western Digital Technologies, Inc., San Jose, CA (US)

(72) Inventors: Dongwoo Kim, San Jose, CA (US); Mahdi Soleymani, San Diego, CA (US); Robert Mateescu, San Jose, CA (US); Cyril Guyot, San Jose, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 359 days.

(21) Appl. No.: 18/231,706

(22) Filed: Aug. 8, 2023

(65) Prior Publication Data

US 2024/0146700 A1    May 2, 2024

Related U.S. Application Data

(60) Provisional application No. 63/416,365, filed on Oct. 14, 2022.

(51) Int. Cl.
H04L 29/06 (2006.01)
H04L 9/00 (2022.01)
H04L 9/40 (2022.01)

(52) U.S. Cl.
CPC .......... H04L 63/0428 (2013.01); H04L 9/008 (2013.01)

(58) Field of Classification Search
CPC . H04L 63/0428; H04L 9/008; H04L 2209/46; H04L 9/085
See application file for complete search history.

(56) References Cited

U.S. PATENT DOCUMENTS 8,630,422 B2 * 1/2014 Gentry .................. H04L 9/0822
                                                         713/193
9,800,517 B1 * 10/2017 Anderson ........... H04L 63/0428
                        (Continued)

FOREIGN PATENT DOCUMENTS

CN        111984990 B       2/2022
WO        2022191770 A1     9/2022

OTHER PUBLICATIONS

Aliasgari et al.; "Distributed and Private Coded Matrix Computation with Flexible Communication Load"; Jan. 2019; available at: https://arxiv.org/pdf/1901.07705.pdf.
                        (Continued)

*Primary Examiner* — Kendall Dolly
(74) *Attorney, Agent, or Firm* — Barry IP Law, P.C.

(57) ABSTRACT

A client device encodes at least two datasets using one or more encoding functions to generate encoded data portions that are encrypted using a first key according to an approximate Fully Homomorphic Encryption (FHE) scheme to generate encrypted data portions that are sent to a plurality of servers. Encrypted results are received from at least a subset of servers of the plurality of servers. Each encrypted result is calculated by a respective server using at least two encrypted data portions received by the server. The encrypted results are decrypted using a secret key according to the approximate FHE scheme to derive decrypted encoded results that are decoded using an approximate decoding function. In one aspect, an encrypted result is calculated by each server by evaluating a multivariate function using the at least two encrypted data portions received by the server.

20 Claims, 6 Drawing Sheets

(56)                    References Cited

U.S. PATENT DOCUMENTS

| | | | |
|---|---|---|---|
| 10,944,552 B2 * | 3/2021 | Leong ................. | H04L 63/0464 |
| 12,001,577 B1 | 6/2024 | Xiong et al. | |
| 2012/0039473 A1 | 2/2012 | Gentry et al. | |
| 2016/0119119 A1 * | 4/2016 | Calapodescu ....... | G06F 21/6227 |
| | | | 380/30 |
| 2017/0134158 A1 * | 5/2017 | Pasol .................... | H04L 9/3066 |
| 2017/0180115 A1 | 6/2017 | Laine et al. | |
| 2018/0234253 A1 * | 8/2018 | Camenisch ......... | H04L 63/0428 |
| 2019/0386814 A1 * | 12/2019 | Ahmed ................... | H04L 9/008 |
| 2020/0387777 A1 * | 12/2020 | Avestimehr .......... | G06N 3/0464 |
| 2022/0060314 A1 * | 2/2022 | Sehrawat ................ | H04L 9/008 |
| 2023/0027010 A1 * | 1/2023 | Raynal .................. | H04L 9/3226 |
| 2025/0038948 A1 * | 1/2025 | Veneroso ................ | H04L 9/008 |

OTHER PUBLICATIONS

Cheon et al.; "Homomorphic encryption for arithmetic of approximate numbers"; International Conference on the Theory and Application of Cryptology and Information Security; Sep. 2017; available at: https://eprint.iacr.org/2016/421.pdf.

Dathathri et al.; "Eva: An encrypted vector arithmetic language and compiler for efficient homomorphic computation"; Proceedings of the 41st ACM SIGPLAN Conference on Programming Language Design and Implementation; 2020; available at: https://arxiv.org/abs/1912.11951.

Dutta et al.; "On the optimal recovery threshold of coded matrix multiplication"; IEEE Transactions on Information Theory; 2019; available at: https://arxiv.org/pdf/1801.10292.pdf.

Jahani-Nezhad et al.; "Berrut approximated coded computing: Straggler resistance beyond polynomial computing"; Feb. 2022; available at: https://arxiv.org/pdf/2009.08327.pdf.

Jeong et al.; "Approximate coded matrix multiplication is nearly twice as efficient as exact multiplication is nearly twice as efficient as exact multipliation"; 2021; available at: https://arxiv.org/pdf/2105.01973.pdf.

Kanagavalli et al.; "Big Data Security using Homomorphic Encryption"; Turkish Journal of Computer and Mathematics Education; 2021; available at: file:///C:/Users/olenk/Dropbox/PC%20(2)/Downloads/10691-Article%20Text-19000-1-10-20210827%20(1).pdf.

Kumar et al.; "Privacy preserving, verifiable and efficient outsourcing algorithm for matrix multiplication to a malicious cloud server"; Mar. 2017; available at: https://www.tandfonline.com/doi/full/10.1080/23311916.2017.1295783.

Pulido-Gaytan et al.; "A Survey on Privacy-Preserving Machine Learning with Fully Homomorphic Encryption"; Sep. 2020; available at: https://www.researchgate.net/publication/344122938_A_Survey_on_Privacy-Preserving_Machine_Learning_with_Fully_Homomorphic_Encryption.

Ramamoorthy et al.; "Universally Decodable Matrices for Distributed Matrix-Vector Multipliation"; Jan. 2019; available at: https://arxiv.org/pdf/1901.10674.pdf.

So et al.; "CodedPrivateML: A Fast and Privacy-Preserving Framework for Distributed Machine Learning"; Jan. 2021; available at: https://eprint.iacr.org/2019/140.pdf.

Tegin et al.; "Straggler Mitigation through Unequal Error Protection for Distributed Matrix Multiplication"; 2021; available at: http://repository.bilkent.edu.tr/bitstream/handle/11693/77047/Straggler_Mitigation_through_Unequal_Error_Protection_for_Distributed_Matrix_Multiplication.pdf?sequence=1.

Troncoso-Pastoriza et al.; "Privacy-Preserving Data Sharing and Computation Across Multiple Data Providers with Homomorphic Encryption"; Jan. 2022; available at: https://link.springer.com/chapter/10.1007/978-3-030-77287-1_3.

Yu et al.; "Straggler Mitigation in Distributed Matrix Multiplication: Fundamental Limits and Optimal Coding"; IEEE Transactions on Information Theory; Jan. 2018; available at: https://arxiv.org/abs/1801.07487.

Yu et al.; "Polynomial Codes: an Optimal Design for High-Dimensional Coded Matrix Multiplication"; Jan. 2018; available at: https://arxiv.org/abs/1705.10464.

Aganya et al.; "Symmetric Fully Homomorphic Encryption Scheme with Polynomials Operations"; Mar. 2018; available at: https://ieeexplore.ieee.org/document/8474729.

Kim et al.; "ARK: Fully Homomorphic Encryption Accelerator with Runtime Data Generation and Inter-Operation Key Reuse"; May 2022; available at: https://arxiv.org/abs/2205.00922.

Hilder Vitor Lima Pereira; "Bootstrapping fully homomorphic encryption over the integers in less than one second"; Aug. 2020; available at: https://eprint.iacr.org/2020/995.

Han et al.; "Efficient Privacy Preserving Logistic Regression Inference and Training"; Nov. 2020; available at: https://eprint.iacr.org/2020/1396.

Migliore et al.; "Exploration of Polynomial Multiplication Algorithms for Homomorphic Encryption Schemes"; Dec. 2015; available at: https://ieeexplore.ieee.org/document/7393307.

Choi et al.; "Impala: Low-Latency, Communication-Efficient Private Deep Learning Inference"; May 2022; available at: https://arxiv.org/abs/2205.06437.

Viand et al.; "SoK: Fully Homomorphic Encryption Compilers"; Jan. 2021; available at: https://arxiv.org/abs/2101.07078.

Pending U.S. Appl. No. 18/231,716, filed Aug. 8, 2023, entitled "Evaluating Convolutions Using Encrypted Data", Dongwoo Kim.

* cited by examiner

Example 1 Coding Without Encryption

Example 1 Coding Without Approximate FHE

Example 1 Coding With Approximate FHE

FIG. 5

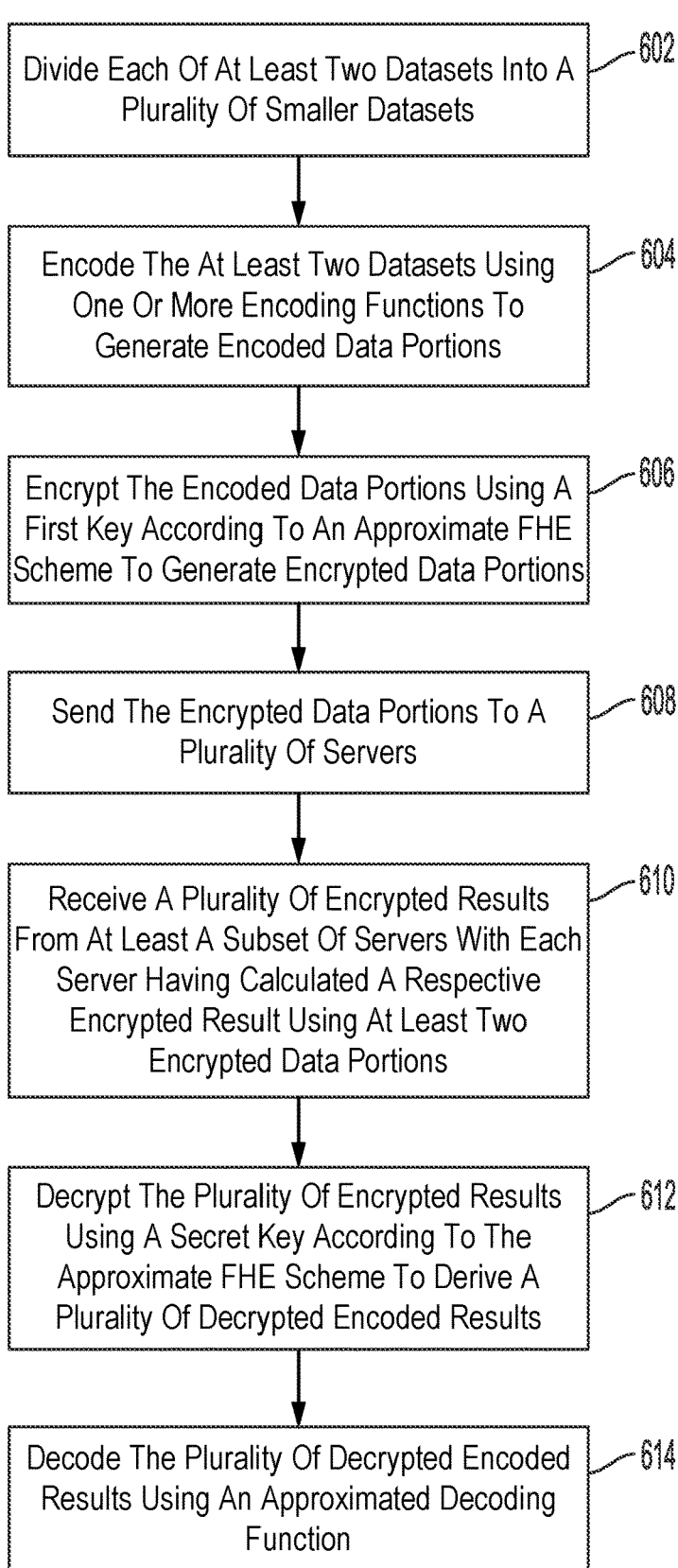

Divide Each Of At Least Two Datasets Into A Plurality Of Smaller Datasets — 602

Encode The At Least Two Datasets Using One Or More Encoding Functions To Generate Encoded Data Portions — 604

Encrypt The Encoded Data Portions Using A First Key According To An Approximate FHE Scheme To Generate Encrypted Data Portions — 606

Send The Encrypted Data Portions To A Plurality Of Servers — 608

Receive A Plurality Of Encrypted Results From At Least A Subset Of Servers With Each Server Having Calculated A Respective Encrypted Result Using At Least Two Encrypted Data Portions — 610

Decrypt The Plurality Of Encrypted Results Using A Secret Key According To The Approximate FHE Scheme To Derive A Plurality Of Decrypted Encoded Results — 612

Decode The Plurality Of Decrypted Encoded Results Using An Approximated Decoding Function — 614

FIG. 6

PRIVACY-PRESERVING DISTRIBUTED COMPUTING

CROSS-REFERENCE TO RELATED APPLICATION

This application claims the benefit of U.S. Provisional Application No. 63/416,365 titled "PRIVACY-PRESERVING DISTRIBUTED COMPUTING", filed on Oct. 14, 2022, which is hereby incorporated by reference in its entirety.

BACKGROUND

Current trends in cloud computing, big data, and Machine Learning (ML) have led to greater needs for distributed computing systems. Such distributed computing systems can include a large number of networked compute servers or worker nodes that perform computations needed for an application executed by a client device or master node. Distributed computation can take advantage of coding schemes, such as Erasure Coding (EC) or Berrut Approximated Coded Computing (BACC), which add redundant data or parity data to allow for a certain number of the worker nodes to fail or return incorrect or late results to the master node and still derive a final result using the correct results received from other worker nodes. Some coding schemes, such as BACC, may provide an approximate result that may require a lower threshold number of correct results to be returned from the worker nodes or a lower amount of computational complexity for the result to be recovered with sufficient accuracy.

In some cases, the data being processed in computing systems can include sensitive data, such as medical data, financial data, or other personal data. With large scale computations, such as computations for ML or big data analysis, it becomes difficult to distribute such computations to worker nodes in a network while maintaining privacy of the data throughout the network. Although the provider of the worker nodes (e.g., a cloud service provider) may be trusted by the master node (e.g., a customer of the cloud service provider), the worker node or its network may become compromised, thereby exposing the data sent by the master node to the worker node.

Various types of homomorphic encryption have been developed to allow encrypted data to be sent to a single worker node and remain encrypted during one or more computations at the worker node without the worker node decrypting the encrypted data before performing the computation or computations. The worker node then sends an encrypted result back to the master node, which decrypts the encrypted result using a secret key. Such homomorphic encryption can safeguard the data provided by the master node to the worker node if the worker node or the communication network between the master node and the worker node becomes vulnerable.

However, such homomorphic encryption schemes have not been used with distributed computing systems including multiple worker nodes since operations performed on data using such homomorphic encryption schemes introduce noise or error into the result, which quickly deteriorates the accuracy of a final result with the addition of more worker nodes and more computations. This has prevented the practical use of such homomorphic encryption schemes in distributed computing systems. The accuracy and recoverability of results further deteriorate when using approximate coding schemes, such as BACC.

BRIEF DESCRIPTION OF THE DRAWINGS

The features and advantages of the embodiments of the present disclosure will become more apparent from the detailed description set forth below when taken in conjunction with the drawings. The drawings and the associated descriptions are provided to illustrate embodiments of the disclosure and not to limit the scope of what is claimed.

FIG. 5 is a graph illustrating a relative error for the approximate coding of FIG. 4 with the addition of approximate Fully Homomorphic Encryption (FHE) according to one or more embodiments.

FIG. 6 is a flowchart for a client-side, privacy-preserving distributed computing process according to one or more embodiments.

DETAILED DESCRIPTION

In the following detailed description, numerous specific details are set forth to provide a full understanding of the present disclosure. It will be apparent, however, to one of ordinary skill in the art that the various embodiments disclosed may be practiced without some of these specific details. In other instances, well-known structures and techniques have not been shown in detail to avoid unnecessarily obscuring the various embodiments.

Example Systems

Figure 1:
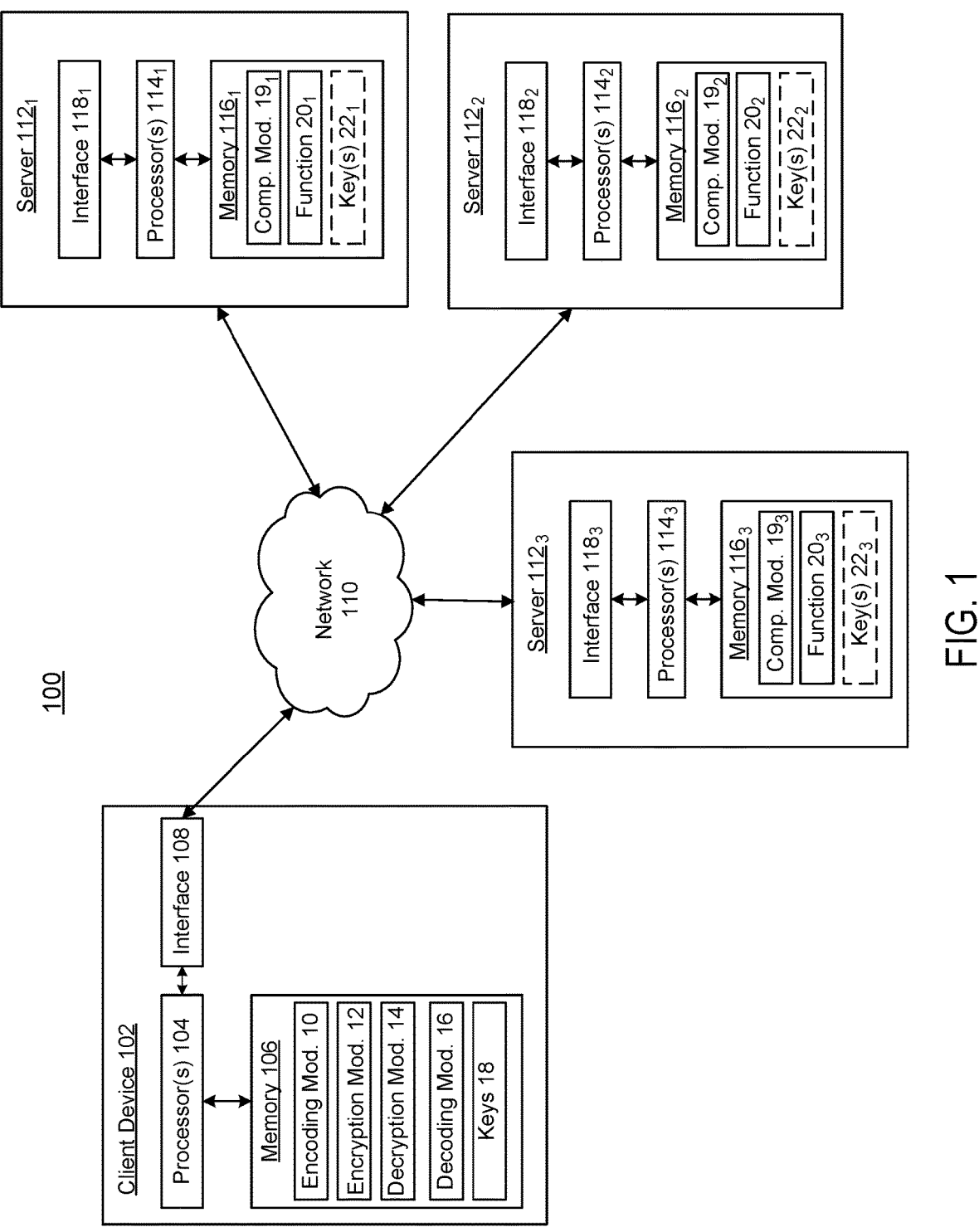
FIG. 1 is a block diagram of an example system for implementing privacy-preserving distributed computing according to one or more embodiments.

FIG. 1 illustrates example distributed system 100 for implementing privacy-preserving, distributed computing according to one or more embodiments. In some implementations, distributed system 100 may perform operations for Machine Learning (ML) or large-scale data analysis, such as for big data applications. As shown in FIG. 1, client device 102 communicates with servers $112_1$, $112_2$, and $112_3$ via network 110. Client device 102 can be considered a master node that sends data to servers 112 for computations to be performed on the data. In this regard, servers 112 can be considered worker nodes that provide results back to client device 102 after performing the computations on the data received from client device 102. In some implementations, servers 112 may be provided as a cloud service or data center for client device 102. In some cases, servers 112 may also be used by other client devices for performing computations and/or for storing data.

Network 110 can include, for example, a Storage Area Network (SAN), a Local Area Network (LAN), and/or a Wide Area Network (WAN), such as the Internet. In this regard, one or more of client device 102 and servers 112 may not be physically co-located. Client device 102 and servers 112 may communicate using one or more standards such as, for example, Ethernet or Fibre Channel.

Client device 102 includes one or more processors 104, interface 108, and memory 106. Processor(s) 104 can execute instructions, such as instructions from one or more applications loaded from memory 106, and can include circuitry such as, for example, a Central Processing Unit (CPU) (e.g., one or more Reduced Instruction Set Computer (RISC)-V cores), a Graphics Processing Unit (GPU), a microcontroller, a Digital Signal Processor (DSP), an Application-Specific Integrated Circuit (ASIC), a Field Programmable Gate Array (FPGA), hard-wired logic, analog circuitry and/or a combination thereof. In some implementations, processor(s) 104 can include a System on a Chip (SoC), which may be combined with memory 106.

Memory 106 can include, for example, a volatile Random Access Memory (RAM) such as Static RAM (SRAM), Dynamic RAM (DRAM), or a non-volatile RAM, or other solid-state memory that is used by processor(s) 104. Data stored in memory 106 can include, for example, data to be encoded and encrypted before being sent to servers 112 and results received from servers 112 that are decrypted and decoded to derive a final result, in addition to instructions loaded from one or more applications for execution by processor(s) 104, and/or data used in executing such applications, such as keys 18.

While the description herein refers to solid-state memory generally, it is understood that solid-state memory may comprise one or more of various types of memory devices such as flash integrated circuits, NAND memory (e.g., Single-Level Cell (SLC) memory, Multi-Level Cell (MLC) memory (i.e., two or more levels), or any combination thereof), NOR memory, EEPROM, other discrete Non-Volatile Memory (NVM) chips, or any combination thereof. In other implementations, memory 106 may include a Storage Class Memory (SCM), such as, Chalcogenide RAM (C-RAM), Phase Change Memory (PCM), Programmable Metallization Cell RAM (PMC-RAM or PMCm), Ovonic Unified Memory (OUM), Resistive RAM (RRAM), Ferroelectric Memory (FeRAM), Magnetoresistive RAM (MRAM), 3D-XPoint memory, and/or other types of solid-state memory, for example.

As shown in the example of FIG. 1, memory 106 stores encoding module 10, encryption module 12, decryption module 14, decoding module 16, and keys 18. As discussed in more detail below with reference to FIG. 2, one or more processors 104 use encoding module 10 to encode datasets to generate data portions that are then encrypted to generate corresponding encrypted data sets that are sent to servers 112 via interface 108. For its part, interface 108 may communicate with servers 112 via network 110 using, for example, Ethernet or Fibre Channel. Interface 108 may include, for example, a Network Interface Card (NIC), a network interface controller, or a network adapter.

Each of servers $112_1$, $112_2$, and $112_3$ in the example of FIG. 1 includes an interface 118, one or more processors 114, and a memory 116. Processor(s) 114 can execute instructions, such as instructions from one or more applications loaded from memory 116. In this regard, servers 112 and client device 102 may each execute portions of a distributed application (e.g., encoding module 10, encryption module 12, decryption module 14, decoding module 16, and computing module 19) that configure client device 102 as a master node and servers 112 as worker nodes that perform functions 20 on encrypted data sent from client device 102 to servers 112 to calculate encrypted results that are returned to client device 102 according to the distributed application. Processor(s) 114 can include circuitry such as, for example, a CPU (e.g., one or more RISC-V cores), a GPU, a microcontroller, a DSP, an ASIC, an FPGA, hard-wired logic, analog circuitry and/or a combination thereof. In some implementations, processor(s) 114 can include an SoC, which may be combined with memory 116.

Memory 116 can include, for example, a volatile RAM such as SRAM, DRAM, or a non-volatile RAM, or other solid-state memory that is used by processor(s) 114. Data stored in memory 116 can include, for example, encrypted data to be used as an input for a function 20 or encrypted data resulting from the function 20. In addition, each memory 116 can store instructions loaded from one or more applications for execution by processor(s) 114, such as computing module 19, and/or data used in executing such applications, such as optional key or keys 22. As discussed in more detail below, keys 22 can include one or more evaluation keys used as part of a Fully Homomorphic Encryption (FHE) scheme that allows for function 20 to be performed on encrypted data and return an encrypted result that can be decrypted using a secret key stored in memory 106 of client device 102.

For its part, interface 118 may communicate with client device 102 via network 110 using, for example, Ethernet or Fibre Channel. Each network interface 118 may include, for example, a NIC, a network interface controller, or a network adapter.

Those of ordinary skill in the art will appreciate with reference to the present disclosure that distributed system 100 in FIG. 1 is for the purposes of illustration and that other implementations may include other components not shown in FIG. 1. For example, other implementations of distributed system 100 can include switches and routers not shown in FIG. 1. Other implementations of distributed system 100 can include many more servers 112, such as hundreds or thousands of servers 112. In addition, other implementations of distributed system 100 can include multiple client devices 102 that may be responsible for performing different parts of distributed computations with help from servers 112. As yet another example variation, the particular modules and arrangements of memory may differ in other implementations, such as with a consolidation of encoding module 10 and decoding module 16 into a single coding module and/or the consolidation of encryption module 12 and decryption module 14 into a single security module. As yet another example variation, and as noted above, key(s) 22 may not be stored in server 112 and may be accessed from another server or from client device 102.

Figure 2:
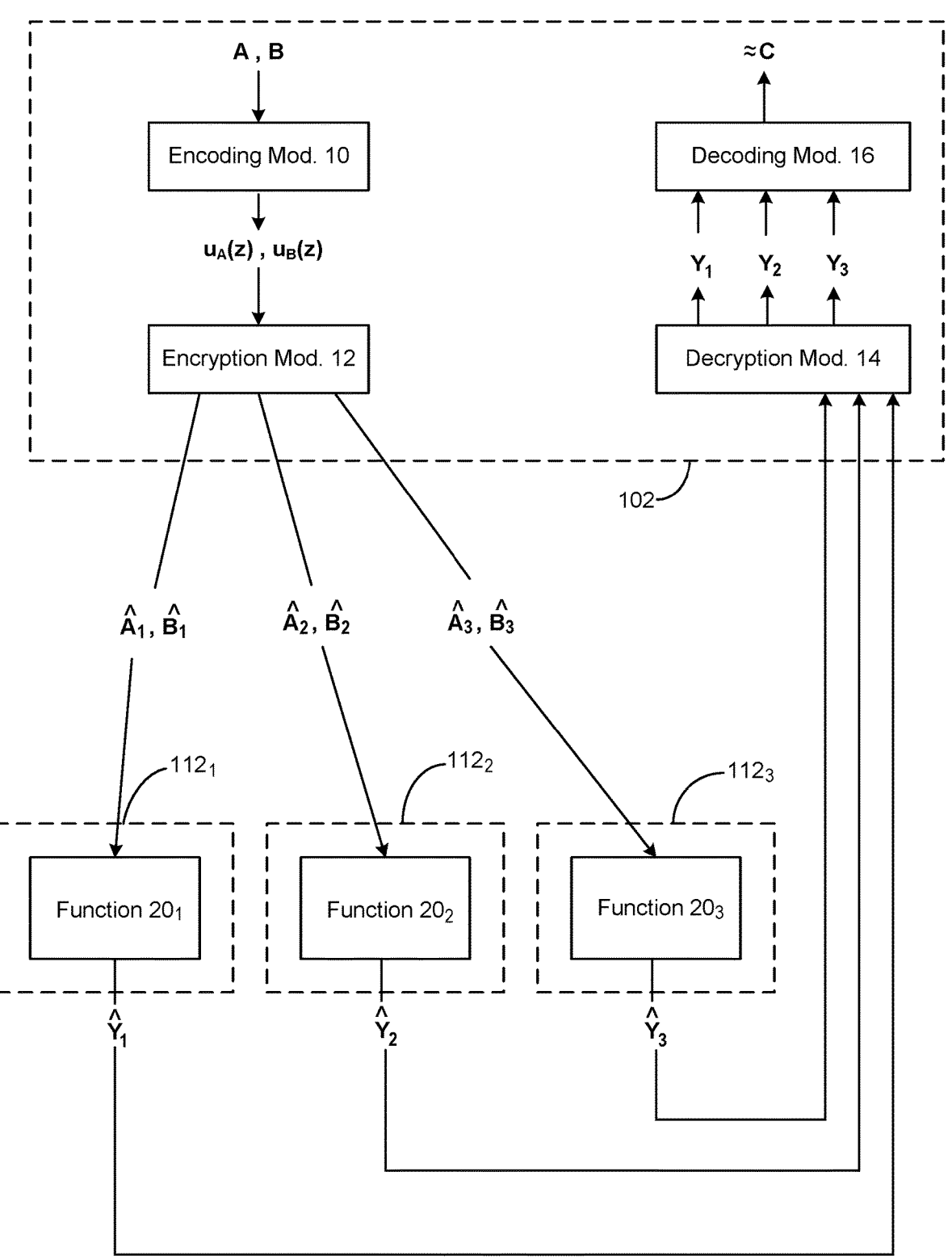
FIG. 2 is a block diagram of an example dataflow in the system of FIG. 1 according to one or more embodiments.

FIG. 2 provides an example dataflow in the system of FIG. 1 according to one or more embodiments. As shown in FIG. 2, encoding module 10 of client device 102 encodes datasets A and B to generate encoded datasets $u_A(z)$ and $u_B(z)$. In some implementations, the first dataset A and the second dataset B can represent first and second matrices or vectors. As used herein, bolded letters or expressions can represent matrices or vectors. In some cases, these matrices or vectors may have already been taken or subdivided out from one or more larger datasets representing larger matrices or vectors. For example, encoding module 10 may begin with two matrices of real numbers $A \in \mathbb{R}^{r \times n}$ and $B \in \mathbb{R}^{n \times c}$ and divide each larger matrix A and B into K portions or chunks as follows.

$$A = [A_1, A_2 \ \ldots \ A_K], \ B = \begin{bmatrix} B_1 \\ B_2 \\ \vdots \\ B_K \end{bmatrix}$$ Eqs. 1

It follows that the multiplication of matrices A and B can be represented as $$AB = \sum_{i=1}^{K} A_i B_i = C,$$

with the multiplications of the portions of the larger matrices A and B being broken down into smaller matrix multiplication operations for smaller matrices $A_1$ through $A_K$ and $B_1$ through $B_K$. In other implementations, each $A_i$ and $B_i$ may instead be a numerical value as opposed to a sub-matrix or sub-dataset.

In a case where client device 102 sends portions of these datasets (i.e., $A_i$ and $B_i$) to servers 112 for multiplying the matrices A and B (i.e., matrix multiplication), distributed system 100 can include K servers that each receive an encoded and encrypted version of a data portion from A and an encoded and encrypted version of a data portion from B to multiply these inputs together and return an encoded and encrypted product to client device 102. For its part, client device 102 decrypts and approximately decodes (e.g., interpolates) the results received from the K servers 112 or from at least a threshold number of the K servers (i.e., M servers) to decode a final result with sufficient accuracy.

Encoding module 10 may use the same encoding function for each dataset or may use different encoding functions for the datasets. In one example, the encoding functions may be similar to a Berrut Approximated Coded Computing (BACC) as shown in Equations 2 below for encoding datasets A and B.

$$u_A(z) = \sum_{i=1}^{K} \frac{\frac{(-1)^{i-1}}{(z-\alpha_i)}}{\sum_{j=1}^{K} \frac{(-1)^{j-1}}{(z-\alpha_j)}} A_i,$$ Eqs. 2

$$u_B(z) = \sum_{i=1}^{K} \frac{\frac{(-1)^{i-1}}{(z-\alpha_i)}}{\sum_{j=1}^{K} \frac{(-1)^{j-1}}{(z-\alpha j)}} B_i$$

where $\alpha_j = \cos\left(\frac{(2j-1)\pi}{2K}\right)$, $j \in [K]$, $u_A(\alpha_i) = A_i$, and $u_B(\alpha_i) = B_i$.

As used herein, for a positive integer N, [N] denotes the set $\{1, 2, \ldots, N\}$. Each of the original data portions of A and B have then been transformed from K submatrices or values into N encoded data portions that can each be represented as $U_A(Z_i)$ and $u_B(z_i)$ with $$z_i = \cos\frac{(i-1)\pi}{N}, \ i \in [N].$$

In some implementations, client device 102 can determine N or the total number of encoded data portions to be derived from encoding one of A or B at least based in part on a degree of the function to be evaluated by each server 112 and/or the number of sub-datasets or smaller datasets (e.g., submatrices) created from one of the larger, initial datasets (i.e., K). In some examples of such implementations, the relationship of the number encoded data portions for one of the datasets (i.e., N) to the number of smaller datasets (i.e., K) and the degree of the function to be evaluated by each server 112 can be expressed as: N>K·deg $f$, where deg $f$ is the degree of the function.

As shown in the example of FIG. 2, encryption module 12 of client device 102 encrypts the encoded data portions $u_A(z)$ and $u_B(z)$ using a homomorphic encryption scheme, such as an approximate FHE, to generate encrypted data portions represented in FIG. 2 as $\widehat{A_1}$ and $\widehat{B_1}$ sent to server 112₁, $\widehat{A_2}$ and $\widehat{B_2}$ sent to server 112₂, and $\widehat{A_3}$ and $\widehat{B_3}$ sent to server 112₃. Encryption module 12 uses a public key, pk, of keys 18 in FIG. 1 to encrypt each data portion generated by encoding module 10.

In more detail, approximate FHE is a public key encryption scheme that can encrypt a vector over complex numbers from set $\mathbb{C}$ as a message. Servers 112 using an evaluation key, evk, can perform component-wise addition and multiplication of the underlying message vectors without decrypting the message vectors. An approximate FHE scheme can include encryption module 12 of client device 102 generating the secret key (sk), the evaluation key (evk), and the public key (pk) based on parameters for the computations including a level parameter (L), a message dimension (n), and a security parameter ($\lambda$).

The messages, or encoded portions of the matrices discussed above (i.e., $A_i$ and $B_i$), are encrypted using the public key (pk) into ciphertext (ct), which can be expressed as $\text{Enc}_{pk}(m) \rightarrow ct$. As part of the encryption, the messages or encoded portions of the matrices discussed above (i.e., $A_i$ and $B_i$), are transformed using a complex number set so that message $m \in \mathbb{C}^n$. Each server 112 receives one or more encrypted data portions as ciphertext $ct_i$ and evaluates a function 20 using the evaluation key (evk) to calculate an encrypted result as ciphertext $ctr_i$, which can be expressed as $\text{Eval}_{evk}(F,\{ct_i\}i \in 1) \rightarrow ctr_i$, where function 20 is represented as F.

In some implementations, each server 112 can receive multiple encrypted data portions and use the encrypted data portions as inputs into a multivariate function. The function $F:(\mathbb{C}^n)^l \rightarrow \mathbb{C}$ can be composed of component-wise addition and/or multiplications with input ciphertexts $\{ct_i\}i \in l$ and can output the ciphertext result $ctr_i$. In keeping with FHE, the multiplicative depth of the function F is less than or equal to the level parameter L. Client device 102 receives the encrypted results from servers 112 and decrypts the encrypted results using decryption module 14 with the secret key sk, which can be expressed as $\text{Dec}_{sk}(ctr_i) \rightarrow m_{ri}$.

The approximate FHE scheme satisfies the following security and correctness properties. As used herein, the notation $a \overset{\$}{\leftarrow} A$ denotes that a is randomly sampled or generated from the set or algorithm A, and $\Pr[a \overset{\$}{\leftarrow} A:P(a)=\text{True}]$ denotes the probability that an element randomly sampled or generated from A satisfies the property P. For semantic security of the approximate FHE scheme, it holds that for any Probabilistic Poly(n)-Time (PPT) adversary $\mathcal{A}$ and $m_0 \neq m_1 \in \mathbb{C}^n$:

$$\Pr\left[ \begin{array}{l} (sk, \ pk, \ evk) \overset{\$}{\leftarrow} KeyGen(params(\lambda)) \\ b \overset{\$}{\leftarrow} \{0, 1\} \qquad : \mathcal{A}(pk, \ evk, \ ct_b) = b \\ ct_b \overset{\$}{\leftarrow} Enc_{pk}(m_b) \end{array} \right] \leq \frac{1}{2} + negl(\lambda).$$ Eq. 3

For correctness, the approximate FHE scheme holds that for all $(m_i)_{i \in I} \in (\mathbb{C}^n)^I$ and any admissible function $F: (\mathbb{C}^n)^I \to \mathbb{C}$:

$$Pr\begin{bmatrix} (sk,\, pk,\, evk) \xleftarrow{\$} KeyGen(params) \\ ct_i \xleftarrow{\$} Enc_{pk}(m_i)(i \in \{1, 2, \ldots, I\}) \end{bmatrix} \quad \text{Eq. 4}$$

$$\begin{bmatrix} |Dec_{sk}(Eval_{evk}(F, ct_1, \ldots, \\ ct_I)) - F(m_1, m_2, \ldots, m_I)| \le \epsilon \end{bmatrix} = 1 - negl(\lambda).$$

While the security is the same as a typical Indistinguishability-Chosen Plaintext Attack (IND-CPA) security of a public-key encryption scheme, the correctness property in Equation 4 above for the disclosed approximate FHE scheme only guarantees that the encrypted result $ctr_i$ is an approximated result with an error bound by $\epsilon$.

In this regard, the approximate coding schemes disclosed herein (e.g., the encoding functions of Equations 2 above and Equations 8 and 10 below with the corresponding decoding functions of Equations 5, 9, and 11 below) are robust against small numerical errors introduced by the approximate FHE scheme. For bounded inputs, the output of the approximate coding schemes is also bounded, which facilitates use of approximate FHE. More information on implementing an approximate FHE scheme can be found in the paper by J.H Cheon, A. Kim, M. Kim, and Y. Song, "Homomorphic Encryption for Arithmetic of Approximate Numbers", in *International Conference on the Theory and Application of Cryptology and Information Security,* Springer, November 2017, pgs. 409-437 and in the paper by R. Datharthri, B. Kostova, O. Saarikivi, W. Dai, K. Laine, and M. Musuvathi, "Eva: An Encrypted Vector Arithmetic Language and Compiler for Efficient Homomorphic Computation", in *Proceedings of the 41st SIGPLAN Conference on Programming Language Design and Implementation,* 2020, pgs. 546-561, each of which is hereby incorporated by reference in its entirety.

Figure 3:
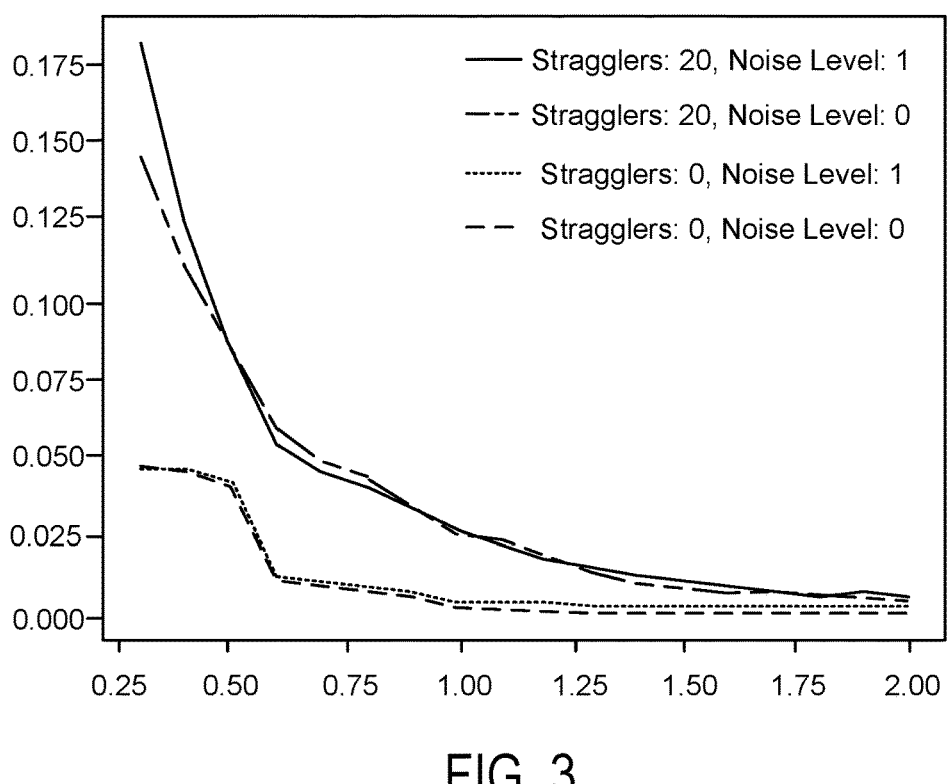
FIG. 3 is a graph illustrating a relative error for an approximate coding used for distributed computations as the ratio of received results to input datasets increases according to one or more embodiments.

In experimental results using Equations 2 above for approximate coding without encryption, the approximation error was measured for different numbers of M servers or worker nodes returning the correct value. In this experiment, the column size of the matrix A was set as $n=10^5$ and the total number of servers or worker nodes was N=200. As shown in FIG. 3, the relative errors shown on the y-axis rapidly approach zero as the number of M worker nodes returning the correct results increases. When M=K, that is when the number of worker nodes or servers returning the correct results equals the number of datasets or submatrices before encoding (i.e., M/K on the x-axis of FIG. 3=1.00), the relative error is less than 0.025 or a relative error of less than 2.5%. Even if 20 worker nodes among the M worker nodes do not return any result or are too late in returning a result (i.e., stragglers), the master node or client device can still retrieve the final result with sufficient accuracy for most applications. Noise was also added into the calculations as shown by the lines in FIG. 3 with noise level 1 to show that the client device can still recover the final result with sufficient accuracy (e.g., less than 0.05 relative error when M/K=1) with some noise. In practice, such noise may occur, for example, from the communications between the client device and the servers.

Figure 4:
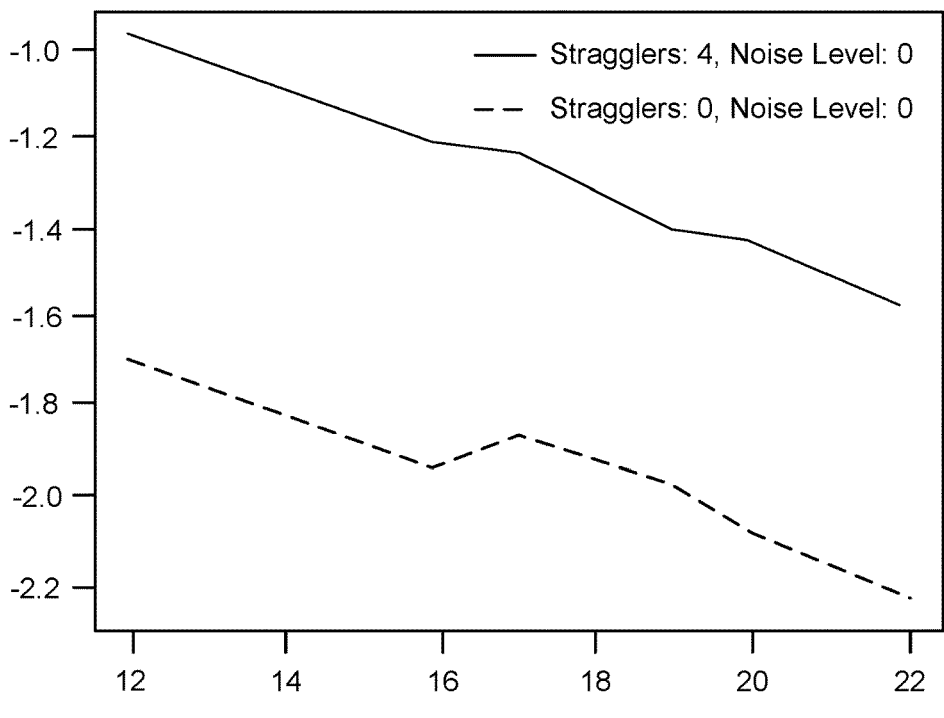
FIG. 4 is a graph illustrating a relative error for an approximate coding used for distributed computations as the number of received results increases according to one or more embodiments.
Figure 5:
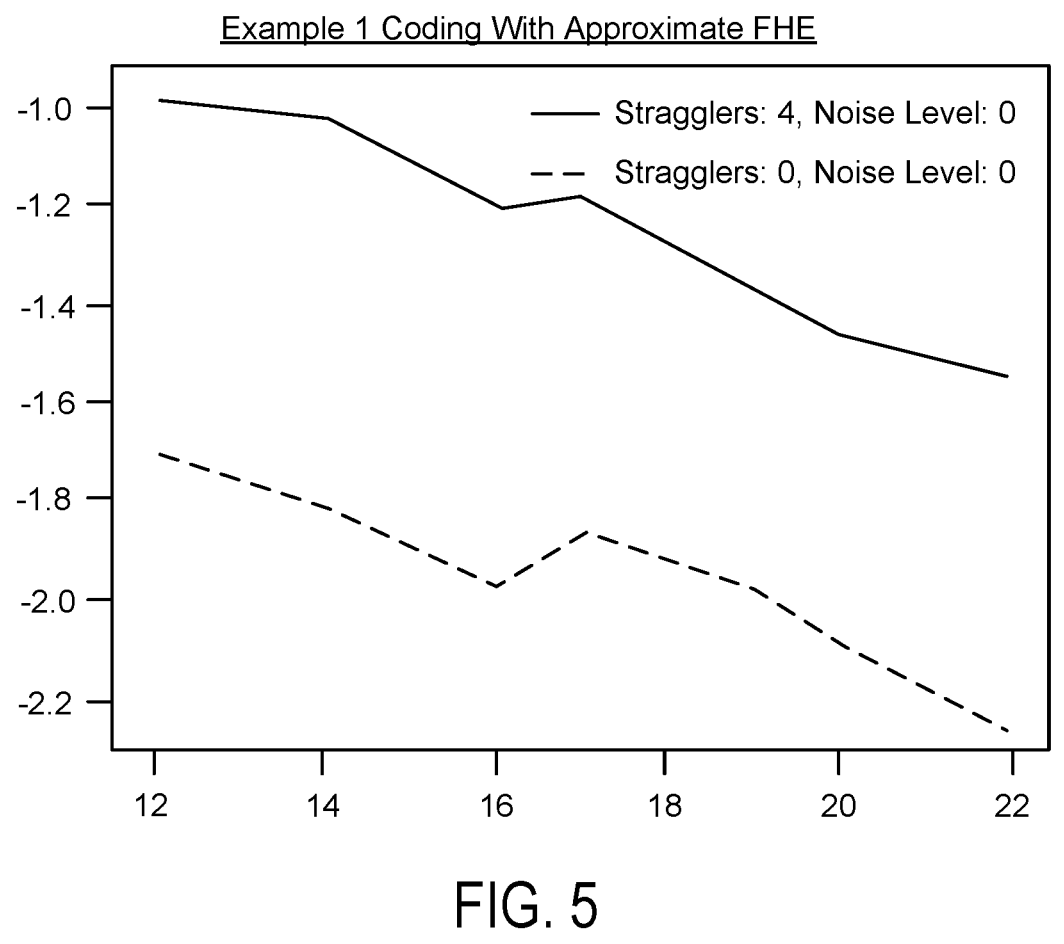

In another experiment, the encoded portions sent to the worker nodes or servers for distributed computations were first encrypted using approximate FHE as discussed above and compared to the same distributed computations without any encryption. FIG. 4 shows the relative error for the unencrypted distributed computations as a function of the number of returned results. In comparison, FIG. 5 shows the relative error for the distributed computations with approximate FHE as a function of the number of returned correct results. The relative errors on the y-axes in FIGS. 4 and 5 are shown on a logarithmic scale such that a value of −2.0 corresponds to a relative error of 0.01. As noted above, and as shown by comparing FIGS. 4 and 5, the robustness of the approximate coding disclosed herein against numerical errors enables the disclosed approximate coding to be combined with approximate FHE without significantly degrading the accuracy of the final result. Accordingly, the approximate coding disclosed herein can provide large scale distributed computations while preserving the privacy of the datasets outside of the client device.

Returning to the example of FIG. 2, each server $112_i$ calculates an encrypted result, $\hat{Y}_i$, by inputting the encrypted data portions $\hat{A}_i$ and $\hat{B}_i$ it receives from client device 102 into a respective function $20_i$, which can be represented as $\hat{Y}_i = \hat{A}_i \hat{B}_i$. In other implementations, each server $112_i$ may calculate a different multivariate function (i.e., more than one input) instead of matrix multiplication. For example, other bilinear functions may be performed using servers 112 while keeping the inputs and result encrypted, such as inner products, convolutions, or cross-products. In addition, the function evaluated by each server 112 can include multiple matrix or vector arithmetic operations using the encrypted data portions received from client device 102. In this regard, each server may perform one or more bootstrapping operations to reduce the level of error or noise introduced into the encrypted calculations in keeping with approximate FHE.

In calculating the encrypted result, each server 112 may use an evaluation key, evk, as part of optional keys 22 in FIG. 1. In some implementations, client device 102 may send the evaluation keys to servers 112 before sending the encrypted data portions or may send the evaluation keys to servers 112 with the encrypted data portions. In other implementations, each server 112 may obtain the evaluation keys from another server.

The encrypted results $\hat{Y}_i$ are returned from servers $112_i$ to client device 102, which uses decryption module 14 to decrypt the encrypted results it receives from servers $112_i$. Decryption module 14 uses a secret key, sk, which may be known only to client device 102, to decrypt the encrypted results. The decrypted results are passed from decryption module 14 to decoding module 16 of client device 102 to decode the decrypted results into an approximated final result, C, representing the multiplication of matrices A and B.

In decoding the decrypted results Y, decoding module 16 can determine when enough decrypted results have been obtained to accurately decode the results into a final result. As discussed above, the encoding enables using only a subset M of all the N results (i.e., from N servers 112) to derive a final result C with sufficient accuracy. Decoding module 16 of client device 102 in some implementations may have a predetermined threshold value for M corresponding to a known or estimated relative error so that client device 102 may wait until the number of received results is equal to or greater than the threshold value for M. In the example where the encoding functions are Equations 2 above, a decoding function is performed by decoding module 16 to interpolate Equation 5 below with the decrypted results Y.

$$r_{Berrut,M}(z) = \sum_{i=1}^{M} \frac{\frac{(-1)^{i-1}}{(z-z_i)}}{\sum_{j=1}^{M} \frac{(-1)^{j-1}}{(z-z_j)}} Y_i \qquad \text{Eq. 5}$$

where $$AB = \sum_{i=1}^{K} A_i B_i \approx \sum_{i=1}^{K} r_{Berrut,M}(\alpha_i) \approx C.$$

The accuracy of the final result C improves as the number of decrypted results increases towards the total number of servers 112 (i.e., as M approaches N). With reference to the original division of datasets A and B into K sub-datasets, an exact recovery of the final result is obtained when M≥2K−1. For approximating the final result, a sufficient recovery threshold for most applications can be obtained when M=K, as discussed above with reference to FIGS. 3 to 5. In practice, good enough approximations may be obtained with less than K results as M approaches K.

In another example implementation, the datasets A and B can be represented as matrices of real numbers $A \in \mathbb{R}^{r \times n}$ and $B \in \mathbb{R}^{n \times c}$ as discussed above, but with matrices A and B being divided into K and K' portions, respectively, as follows so that the matrices A and B are divided into different numbers of submatrices or sub-datasets.

$$A = \begin{bmatrix} A_1 \\ A_2 \\ \vdots \\ A_K \end{bmatrix}, B = [B_1, B_2 \ \dots \ B_{K'}] \qquad \text{Eqs. 6}$$

It follows that the multiplication of matrices A and B can be represented as follows.

$$C = AB = \begin{bmatrix} A_1 B_1 & \cdots & A_1 B_{K'} \\ \vdots & \ddots & \vdots \\ A_K B_1 & \cdots & A_K B_{K'} \end{bmatrix} \qquad \text{Eq. 7}$$

Encoding module 10 may then instead use encoding functions of Equations 8 below in place of Equations 2 above to encode matrices A and B.

$$u_A(z) = \sum_{i=1}^{t} \frac{\frac{(-1)^{i-1}}{(z-\alpha_i)}}{\sum_{j=1}^{t} \frac{(-1)^{j-1}}{(z-\alpha_j)}} A_{\lfloor \frac{i}{K} \rfloor}, \qquad \text{Eqs. 8}$$

$$u_B(z) = \sum_{i=1}^{t} \frac{\frac{(-1)^{i-1}}{(z-\alpha_i)}}{\sum_{j=1}^{t} \frac{(-1)^{j-1}}{(z-\alpha_j)}} B_{i \bmod K'}$$

where $t = KK'$ and $\alpha_j = \cos\left(\frac{(2j-1)\pi}{2t}\right)$, $j \in [t]$ are used as interpolation points.

Each of the original data portions of A and B have then been transformed from K submatrices and K' submatrices, respectively, into N encoded data portions that can each be represented as $u_A(z_i)$ and $u_B(z_i)$ with $$z_i = \cos\frac{(i-1)\pi}{N}, i \in [N].$$

Client device 102 may determine N or the total number of encoded data portions to be derived from encoding A or B at least based in part on a degree of the function to be evaluated by each server 112 and/or the number of sub-datasets or smaller datasets (e.g., submatrices) created from one of the larger, initial datasets (i.e., K or K').

As in the example discussed above, encryption module 12 encrypts the encoded data portions $u_A(z)$ and $u_B(z)$ using an approximate FHE scheme to generate encrypted data portions represented in FIG. 2 as $\widehat{A_1}$ and $\widehat{B_1}$ sent to server 112$_1$, $\widehat{A_2}$ and $\widehat{B_2}$ sent to server 112$_2$, and $\widehat{A_3}$ and $\widehat{B_3}$ sent to server 112$_3$. Encryption module 12 uses a public key pk of keys 18 in FIG. 1 to encrypt each data portion generated by encoding module 10.

As with the first example above, each server 112$_i$ calculates an encrypted result $\hat{Y}_i$ by inputting the encrypted data portions $\hat{A}_i$ and $\hat{B}_i$ it receives from client device 102 into a respective function 20$_i$, which can be represented as $\hat{Y}_i = \hat{A}_i \hat{B}_i$. The encrypted results $\hat{Y}_i$ are returned from servers 112$_i$ to client device 102, which uses decryption module 14 to decrypt the encrypted results it receives from servers 112$_i$. The decrypted results are passed from decryption module 14 to decoding module 16 of client device 102 to decode the decrypted results into the approximated final result, C, representing the multiplication of matrices A and B.

In decoding the decrypted results Y in this second example implementation, decoding module 16 can determine when enough decrypted results have been obtained to accurately decode the results into a final result. As discussed above, the encoding enables using only a subset M of all the N results (i.e., from N servers 112) to approximate a final result C with sufficient accuracy. In the example where the encoding functions are Equations 8 above, a decoding function is performed by decoding module 16 to interpolate Equation 5 above with the decrypted results Y.

Unlike the first example implementation above where Equations 2 are used as the encoding functions, decoding module 16 can approximate the final result with a recovery threshold of $$M = \frac{KK'}{2}$$

for the second example implementation, as opposed to the recovery threshold discussed above for the first example implementation of M=K. Client device 102 approximates the final result C as:

$$C = A_j B_l \approx r_{Berrut,M}(\alpha_{(j-1)K'+l}) \text{ for all } j \in [K] \text{ and } l \in [K']. \qquad \text{Eq. 9}$$

As a variation, K and K' can be selected so as to be coprime, i.e., gcd(K, K')=1, the encoding function for $u_A(z)$ in Equations 8 above can then be replaced with Equation 10 below.

$$u_A(z) = \sum\nolimits_{i=1}^{t} \frac{\frac{(-1)^{i-1}}{(z-\alpha_i)}}{\sum_{j=1}^{t} \frac{(-1)^{j-1}}{(z-\alpha_j)}} A_{imodK}$$

<div align="right">Eq. 10</div>

When decoding, Equation 9 is replaced with:

$$C = A_{imodK} B_{imodK} \approx r_{Berrut,M}(\alpha_i).$$

<div align="right">Eq 11</div>

The second example implementation using the encoding functions of Equations 8 and/or Equation 10 above in place of the encoding functions of the first example implementation with Equations 2 provides for a lower communication complexity with less data needing to be sent to servers 112 and less data being received from servers 112, but the second example implementation has a higher recovery threshold requiring more correct results to be received from servers 112 for a similar relative error in the final result. In more detail, each server 112 in the first example (i.e., using Equations 2 and 5) performs matrix multiplication on two matrices of dimensions $$r \times \frac{n}{K} \text{ and } \frac{n}{K} \times c,$$

resulting in a matrix having dimensions r×c. In contrast, each server 112 in the second example (i.e., using Equations 8 and/or 10 for encoding and Equations 5 and 10 or 11 for decoding) performs matrix multiplication on two matrices of dimensions $$\frac{r}{K} \times n \text{ and } n \times \frac{c}{K'},$$

resulting in a matrix having dimensions $$\frac{r}{K} \times \frac{c}{K'}.$$

The recovery threshold for the first and second examples are K and $$\frac{KK'}{2},$$

respectively, and the communication cost for recovery is Krc and $$\frac{rc}{2},$$

respectively. The communication complexity of the first example is larger by a factor of K, but its recovery threshold is smaller by a factor of K'.

Example implementations 1 and 2 above can be viewed as extremes of a tradeoff between communication complexity and recovery threshold. In other implementations, client device 102 may divide A and B into submatrices differently than in examples 1 and 2 to provide a communication complexity and recovery threshold between the extremes of examples 1 and 2. In such implementations, client device

102 divides A and B into respective n rows and m columns of submatrices or sub-datasets, as opposed to the $n_A 32$ $1 \times m_A = K$ submatrices of A and $n_B = K \times m_B = 1$ submatrices of B in example 1 (i.e., as in Equations 1 above), or the $n_A = K \times m_A = 1$ submatrices of A and $n_B = 1 \times m_B = K$ submatrices of B in example 2 (i.e., as in Equations 6 above).

By approximating the final result (e.g., C) using the coding disclosed herein, it is possible to distribute the computations among many servers 112 with a lower recovery threshold while using a fixed communication complexity, as compared to computing an exact result. The computational cost of using the approximate distributed computing and approximate FHE is similar to using conventional FHE where only one server 112 performs the encrypted computations, while the computational cost per server is significantly less due to the greater number of servers 112 permitted with the disclosed approximate coding.

For example, using conventional FHE for matrix multiplication could be performed with one server computing $$AB = \sum\nolimits_{i=1}^{K} A_i B_i,$$

which means performing K matrix multiplications. As discussed for example 1 above, each server 112 using the systems and methods of the present disclosure means each server 112 performs one matrix multiplication using approximate FHE with K servers 112 to obtain an approximate final result. On the other hand, providing an exact final result would require 2K servers 112. In summary, the distributed systems and methods disclosed herein use an approximate coding with approximate FHE with a similar computational complexity as conventional FHE used with a single server (i.e., K matrix multiplications) if allowing for an approximate result, while the computational cost per server is significantly less.

Although the above examples are discussed in terms of matrix multiplication operations being performed by servers 112, distributed system 100 can be used for other types of bilinear functions. A function B: V×W→Z is considered bilinear if it satisfies Equations 12 below.

$$a. \mathcal{B}_{(v_1,w_1)} + b. \mathcal{B}_{(v_2,w_1)} = z, 62 \ (av_1 + bv_2, w_1)$$

$$a. \mathcal{B}_{(v_1,w_1)} + b. \mathcal{B}_{(v_1,w_2)} = \mathcal{B}_{(v_1, aw_1 + bw_2)}$$

<div align="right">Eqs. 12</div> where V and W are vector spaces over F including real or complex numbers (e.g., $\mathbb{R}^n$, $\mathbb{C}^n$) with a and b from F (e.g., $\mathbb{R}, \mathbb{C}$). To compute $$\mathcal{B}\left(\sum\nolimits_{i=1}^{K} A_i, \sum\nolimits_{i=1}^{K} B_i\right),$$

the same encoding functions from Equations 2 can be used. Each server 112, computes $\widehat{Y_1} = \mathcal{B}(\widehat{A_1}, \widehat{B_1})$ and returns the encrypted result to client device 102. Such bilinear functions can include matrix or vector arithmetic operations (e.g., matrix multiplication as discussed above), inner product operations, convolutions, or cross-product operations.

Unlike conventional BACC, which approximates a function f over a dataset $X = (X_0 \ldots, X_{K-1})$, the disclosed systems and methods can approximate multivariate functions with more than one input argument (e.g., approximating a function g(X,Y)). Although matrix multiplication is discussed in the above examples, distributed system 100 and the disclosed methods can approximate a multivariate function over multiple datasets (e.g., vectors, matrices).

In addition, the systems and methods disclosed herein can preserve the privacy of the input datasets with ciphertext indistinguishability (e.g., IND-CPA secure), unlike the current use of BACC. The rational functions used for the second example pass through each submatrix multiple times with different interpolation points, whereas in BACC, the rational function only passes through each submatrix once. As noted above, and in contrast to BACC, the above disclosed distributed systems and methods can exploit the tradeoff between communication complexity and threshold recovery for approximate matrix multiplication.

Those of ordinary skill in the art will appreciate with reference to the present disclosure that implementations of the privacy-preserving distributed computing disclosed herein can be practiced with many more servers 112 and many more corresponding encrypted data portions. For example, and as noted above, some results using the privacy-preserving distributed computing disclosed herein have been obtained with 200 servers or worker nodes for matrix multiplication of an A matrix of $10^5$ columns with a B matrix of $10^5$ rows.

Example Processes

FIG. 6 is a flowchart for a client-side, privacy-preserving distributed computing process according to one or more embodiments. The process of FIG. 6 can be performed by, for example, at least one processor 104 of client device 102 in FIG. 1 executing encoding module 10, encryption module 12, decryption module 14, and decoding module 16. The distributed computing process of FIG. 6 may be performed for a variety of different types of computations, such as multivariate functions including matrix arithmetic functions, inner product functions, convolutions, or cross-product functions.

In block 602, at least two datasets are divided or partitioned into a plurality of smaller datasets. In some cases, the datasets can include large matrices or vectors that are divided into multiple smaller submatrices or portions of the larger vectors. In other implementations of the distributed computation process of FIG. 6, block 602 may be omitted, such as when the values from the at least two datasets are to be directly encoded without dividing the dataset into smaller subsets. In such implementations, the number of worker nodes or servers can be equal to or greater than the number of values in the largest dataset.

In implementations where the number of values in the largest dataset exceed the number of worker nodes or servers, the at least two datasets can be divided into equal numbers of smaller datasets, as with the first example discussed above for Equations 1 (e.g., K submatrices from each of larger matrices A and B). In other implementations, the at least two datasets can be divided into different numbers of smaller datasets, as with the second example discussed above for Equations 6 (e.g., K submatrices from larger matrix A and K' submatrices from larger matrix B).

In block 604, the at least two datasets, whether having been divided into smaller datasets in block 602 or not, are encoded using one or more encoding functions to generate encoded data portions. As discussed above, the encoding functions used for each of the at least two datasets can be the same, as with the example of Equations 2. In other implementations, the encoding functions used for each of the at least two datasets can be different, as with the example of Equations 8 above. The number of encoded data portions from each larger dataset that are generated by the encoding function or functions in most implementations equals the number of worker nodes or servers that will be used to perform the distributed computations (e.g., N encoded data portions generated from matrix A that are sent to N servers 112). The encoded data portions may also be indexed (e.g., i=1, . . . ,N) so that encoded data portions with the same index are sent to the same server as inputs into a multivariate function evaluated by the server.

In block 606, the encoded data portions generated in block 604 are encrypted using a first key according to an approximate FHE encryption scheme to generate encrypted data portions. As discussed above, the first key can be a public key, pk. The indexing of the encrypted data portions may remain the same as for the encoded data portions to ensure the correct encrypted data portions are sent to the same server for computation.

In block 608, the client device sends the encrypted data portions to a plurality of servers (i.e., N servers) for the servers to perform operations on the encrypted data portions. By using an approximate FHE scheme, the servers can perform the operations (e.g., multiplication, addition, subtraction) using the encrypted data portions without having to decrypt the encrypted data portions. The input data or original datasets therefore remain encrypted to protect the privacy of the data while still taking advantage of the processing and fault-tolerance benefits of distributed computing, which may otherwise present data privacy concerns. The client device may also send an evaluation key to each server with the one or more encrypted data portions sent to each server that is used as part of the approximate FHE scheme to enable the computations to be performed with the encrypted data portions. In other implementations, each server may already store an evaluation key for performing the encrypted operations (e.g., keys 22 in FIG. 1) or may obtain the keys from another server acting as a key repository.

In block 610, the client device receives a plurality of encrypted results from at least a subset of the servers with each server having calculated a respective encrypted result using at least two encrypted data portions. As discussed above, the approximate coding allows for recovery of an approximate result with less than all of the results from the servers. A recovery threshold M can be set so that the client device may only need M out of N results to recover the final result from the distributed computations with sufficient accuracy. The recovery threshold may vary by application and by the chosen coding scheme, as discussed above.

In this regard, the first coding example discussed above using Equations 2 and 5 may have a recovery threshold of M=K, where K would be the number of sub-datasets formed in block 602. In such an example, the client device may begin decoding the received encrypted results after decrypting the results and in response to receiving at least K encrypted results. The client device may also perform error detection, such as with a Cyclic Redundancy Check (CRC) or other algorithm known in the art, by using information included in one or more packets received from the server to determine if a payload of the one or more packets including the encrypted result has been transmitted without errors. In such examples, the client device may only decrypt the encrypted results that pass the error detection and wait until receiving the threshold number (i.e., M) encrypted results that pass the error detection before performing decoding to derive the approximate final result.

If using the second coding example discussed above with Equations 8, 9, and/or 10 and 11, the recovery threshold may instead be $$M = \frac{KK'}{2},$$

where K and K' would be the respective numbers of sub-datasets formed in block 602. As with the example above where the recovery threshold is M=K, the client device may decrypt the encrypted results as they are received, assuming the encrypted results pass an error check in some implementations, and then begin decoding the decrypted results after decrypting at least M results.

In block 612, the client device can decrypt the plurality of encrypted results using a secret key, sk, according to the approximate FHE scheme to derive a plurality of decrypted encoded results. As noted above, the decryption may be performed as the encrypted results are received and may also follow an error check to ensure that the data in the encrypted result has not been corrupted in transit from the server to the client device. The approximate coding disclosed herein can advantageously allow for a certain number of results to be discarded, not received, or received late (i.e., stragglers) and still facilitate recovery of an approximate final result with sufficient accuracy. Moreover, the approximate coding disclosed herein also enables the use of approximate FHE, which introduces a bounded error into the calculations performed by the servers.

In block 614, the decrypted encoded results from block 612 are decoded using an approximate decoding function, such as the functions from Equations 5, 9, or 11 above. In some implementations, the decoding may take place as the encrypted results are being decrypted due to the nature of the decoding function, which may allow for decoded results to be added piecemeal with a more accurate final result being updated with each additional decrypted result being used in the decoding function. In other words, the client device in some implementations may not wait for a certain threshold number of encrypted results to be received and may begin decoding before all of the threshold number of M results have been received. In some implementations, the client device may stop decoding after using the recovery threshold number M of decrypted results in the decoding function. In other implementations, the client device may continue updating the final result until reaching a timeout value for receiving additional straggler encrypted results from additional servers.

Those of ordinary skill in the art will appreciate with reference to the present disclosure that the distributed computing process of FIG. 6 may differ in other implementations or that the order of blocks shown in FIG. 6 may differ. For example, block 602 may be omitted in implementations where the initial datasets do not need to be subdivided into smaller datasets due to a sufficient number of available servers to handle all of the values in the largest dataset. In addition, the performance of blocks 604, 606, and/or 608 may overlap such that certain sub-datasets or datasets are encoded while other sub-datasets or datasets that have already been encoded are encrypted in block 606 or sent in block 608. As another variation, the performance of blocks 610 to 614 may overlap with additional encrypted results being received as decryption is performed in block 612 for previously received results or as decoding is performed in block 614 for results that have already been decrypted.

Figure 7:
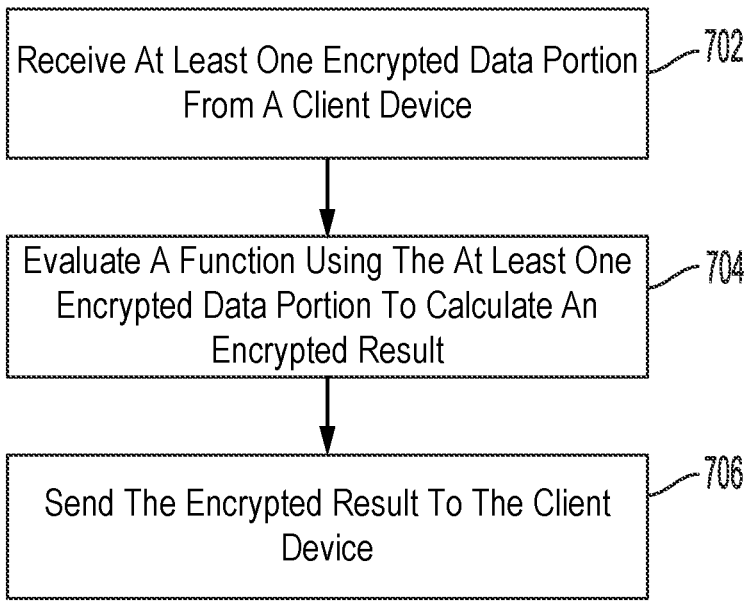
FIG. 7 is a flowchart for a server-side, privacy-preserving distributed computing process according to one or more embodiments.

FIG. 7 is a flowchart for a server-side, privacy-preserving distributed computing process according to one or more embodiments. The process of FIG. 7 can be performed by, for example, at least one processor 114 of a server 112 in FIG. 1 executing computation module 19 using function 20. As will be appreciated by those of ordinary skill in the art with reference to present disclosure, the computation process of FIG. 7 can be performed concurrently by multiple servers to accomplish distributed computations at each server or worker node.

In block 702, the server receives at least one encrypted data portion from a client device. In some implementations, each server can receive two or more encrypted data portions that represent encoded and encrypted portions of larger datasets that are to be multiplied together or to have another type of operation performed on them. For example, each encrypted data portion can serve as an input into a bilinear function, such as matrix multiplication, an inner product function, a convolution, or a cross-product function. In other examples, the function performed by the computing module of the server can include multivariate functions of a higher degree, such as the multiplication of three encrypted data portions.

In block 704, the server evaluates a function (e.g., function 20 in FIG. 1) using the at least one encrypted data portion received in block 702 to calculate an encrypted result. As discussed above, the server can follow an approximate FHE encryption scheme such that the server uses an evaluation key, evk, to calculate the encrypted result without decrypting the encrypted data portions received in block 702. In some cases, the server may also perform bootstrapping between operations being performed on the encrypted data portions to keep the error introduced by the encrypted operations within an acceptable limit.

In block 706, the server sends the encrypted result to the client device that had sent the encrypted data portions. As discussed above with reference to the distributed computation process of FIG. 6, the client device can decrypt the encrypted results it receives from servers 112 and decode the decrypted results to derive an approximate final result for the distributed computation.

Those of ordinary skill in the art will appreciate with reference to the present disclosure that the server-side, distributed computing process of FIG. 7 may differ in other implementations or that the order of the blocks shown in FIG. 7 may differ. For example, the server may receive encrypted data portions at different times in block 702 or may partially evaluate a function in block 704 before receiving all of the encrypted data portions in block 702 in some implementations.

The foregoing distributed computation systems and processes using the disclosed approximate coding schemes can enable the use of approximate FHE in large scale distributed systems to maintain data privacy, while providing the benefits of distributed computing, such as a lower computational cost per server and improved error and failure tolerance. In addition, the foregoing distributed computation systems and processes can provide sufficiently accurate final results despite the errors or noise introduced by approximate FHE and with lower recovery thresholds as compared to exact coding schemes.

Other Embodiments

Those of ordinary skill in the art will appreciate that the various illustrative logical blocks, modules, and processes described in connection with the examples disclosed herein may be implemented as electronic hardware, computer software, or combinations of both. Furthermore, the foregoing processes can be embodied on a computer readable medium which causes processor or controller circuitry to perform or execute certain functions.

To clearly illustrate this interchangeability of hardware and software, various illustrative components, blocks, and modules have been described above generally in terms of their functionality. Whether such functionality is implemented as hardware or software depends upon the particular application and design constraints imposed on the overall system. Those of ordinary skill in the art may implement the described functionality in varying ways for each particular application, but such implementation decisions should not be interpreted as causing a departure from the scope of the present disclosure.

The various illustrative logical blocks, units, modules, processor circuitry, and controller circuitry described in connection with the examples disclosed herein may be implemented or performed with a general purpose processor, a GPU, a DSP, an ASIC, an FPGA or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. Processor or controller circuitry may also be implemented as a combination of computing devices, e.g., a combination of a DSP and a microprocessor, a plurality of microprocessors, an SoC, one or more microprocessors in conjunction with a DSP core, or any other such configuration.

The activities of a method or process described in connection with the examples disclosed herein may be embodied directly in hardware, in a software module executed by processor or controller circuitry, or in a combination of the two. The steps of the method or algorithm may also be performed in an alternate order from those provided in the examples. A software module may reside in RAM memory, flash memory, ROM memory, EPROM memory, EEPROM memory, registers, hard disk, a removable media, an optical media, or any other form of storage medium known in the art. An exemplary storage medium is coupled to processor or controller circuitry such that the processor or controller circuitry can read information from, and write information to, the storage medium. In the alternative, the storage medium may be integral to processor or controller circuitry. The processor or controller circuitry and the storage medium may reside in an ASIC or an SoC.

The foregoing description of the disclosed example embodiments is provided to enable any person of ordinary skill in the art to make or use the embodiments in the present disclosure. Various modifications to these examples will be readily apparent to those of ordinary skill in the art, and the principles disclosed herein may be applied to other examples without departing from the spirit or scope of the present disclosure. The described embodiments are to be considered in all respects only as illustrative and not restrictive. In addition, the use of language in the form of "at least one of A and B" in the following claims should be understood to mean "only A, only B, or both A and B."

What is claimed is:

1. A client device, comprising:
an interface configured to communicate with a plurality of servers; and
at least one hardware processor, individually or in combination, configured to:

encode a first dataset using an encoding function to generate a first set of encoded data portions;
encode a second dataset using the encoding function or a different encoding function to generate a second set of encoded data portions;
encrypt the first and second sets of encoded data portions using a first key according to an approximate Fully Homomorphic Encryption (FHE) scheme to generate first and second sets of encrypted encoded data portions;
send, via the interface, the first and second sets of encrypted encoded data portions to the plurality of servers;
receive, via the interface, a plurality of encrypted encoded results from at least a subset of servers of the plurality of servers, wherein each encrypted encoded result of the plurality of encrypted encoded results, received from a respective server, is based on at least one encrypted encoded data portion from each of the first set of encrypted encoded data portions and the second set of encrypted encoded data portions;
decrypt the received plurality of encrypted encoded results using a secret key according to the approximate FHE scheme to derive a plurality of decrypted encoded results; and
decode the plurality of decrypted encoded results using an approximate decoding function.

2. The client device of claim 1, wherein the first dataset and the second dataset represent respective first and second matrices, and wherein the at least one hardware processor, individually or in combination, is further configured to:
divide the first dataset into a first set of smaller datasets representing smaller matrices within the first matrix; and
divide the second dataset into a second set of smaller datasets representing smaller matrices within the second matrix.

3. The client device of claim 1, wherein the at least one hardware processor, individually or in combination, is further configured to:
divide the first dataset into a first number of smaller datasets; and
divide the second dataset into a second number of smaller datasets, wherein the first number of smaller datasets does not equal the second number of smaller datasets.

4. The client device of claim 1, wherein the at least one hardware processor, individually or in combination, is further configured to send, to each server of the plurality of servers, a first encrypted encoded data portion from the first set of encrypted encoded data portions and a second encrypted encoded data portion from the second set of encrypted encoded data portions to multiply the first and second encrypted encoded data portions with each other.

5. The client device of claim 1, wherein the at least one hardware processor, individually or in combination, is further configured to determine a total number of encoded data portions to be derived from encoding one of the first dataset or the second dataset based at least in part on a degree of a function to be evaluated by each server of the plurality of servers to calculate the encrypted encoded result.

6. The client device of claim 1, wherein the at least one hardware processor, individually or in combination, is further configured to:
divide the first dataset into a first set of smaller datasets;
divide the second dataset into a second set of smaller datasets;

encode the first set of smaller datasets to generate the first set of encoded data portions; and encode the second set of smaller datasets to generate the second set of encoded data portions.

7. A method for distributed computation, the method comprising:

encoding at least two datasets using one or more encoding functions to generate encoded data portions;

encrypting the encoded data portions using a first key according to an approximate Fully Homomorphic Encryption (FHE) scheme to generate encrypted encoded data portions;

sending the encrypted encoded data portions to a plurality of servers;

receiving a plurality of encrypted encoded results from at least a subset of servers from the plurality of servers, wherein each server of the at least a subset of servers calculates a respective encrypted encoded result by evaluating a multivariate function using at least two encrypted encoded data portions received by the server;

decrypting the received plurality of encrypted encoded results using a secret key according to the approximate FHE scheme to derive a plurality of decrypted encoded results; and decoding the plurality of decrypted encoded results using an approximate decoding function.

8. The method of claim 7, wherein the at least two datasets represent respective matrices, and wherein the method further comprises dividing each of the at least two datasets into a plurality of smaller datasets that each represent a smaller matrix within one of the respective matrices.

9. The method of claim 7, further comprising:

dividing a first dataset into a first set of smaller datasets; and dividing a second dataset into a second set of smaller datasets, wherein the number of smaller datasets in the first set of smaller datasets does not equal the number of smaller datasets in the second set of smaller datasets.

10. The method of claim 7, wherein each server of the plurality of servers evaluates the multivariate function as a bilinear function using a first encrypted encoded data portion from a first set of encrypted encoded data portions as a first input to the bilinear function and using a second encrypted encoded data portion from a second set of encrypted encoded data portions as a second input to the bilinear function.

11. The method of claim 7, wherein each server of the plurality of servers performs at least one matrix or vector arithmetic operation using the at least two encrypted encoded data portions received from the client device.

12. The method of claim 7, further comprising sending, to each server of the plurality of servers, a first encrypted encoded data portion from a first set of encrypted encoded data portions and a second encrypted encoded data portion from a second set of encrypted encoded data portions to multiply the first and second encrypted encoded data portions with each other.

13. The method of claim 7, further comprising determining a total number of encoded data portions to be derived from encoding one dataset of the at least two datasets based at least in part on a degree of the multivariate function to be evaluated by each server of the plurality of servers to calculate an encrypted encoded result of the plurality of encrypted encoded results.

14. The method of claim 7, further comprising:

dividing a dataset of the at least two datasets into a number of smaller datasets; and setting a number of servers to use for the plurality of servers based at least in part on the number of smaller datasets.

15. A server, comprising:

an interface configured to communicate with a client device; and at least one hardware processor, individually or in combination, configured to:

receive a first encrypted data portion and a second encrypted data portion from the client device, wherein the first encrypted data portion is from a first set of encrypted data portions and the second encrypted data portion is from a second set of encrypted data portions, the first and second sets of encrypted data portions having been encrypted using an approximate Fully Homomorphic Encryption (FHE) scheme;

calculate an encrypted result by at least in part evaluating a multivariate function using the first encrypted data portion as a first input to the multivariate function and using the second encrypted data portion as a second input to the multivariate function; and send the encrypted result to the client device.

16. The server of claim 15, wherein the at least one hardware processor, individually or in combination, is further configured to evaluate the multivariate function by performing at least one matrix or vector arithmetic operation using the first encrypted data portion and the second encrypted data portion.

17. A system, comprising:

a plurality of servers; and a client device including means for:

encoding a first dataset using an encoding function to generate a first set of encoded data portions;

encoding a second dataset using the encoding function or a different encoding function to generate a second set of encoded data portions;

encrypting the first and second sets of encoded data portions using a first key according to an approximate Fully Homomorphic Encryption (FHE) scheme to generate first and second sets of encrypted encoded data portions; and sending the first and second sets of encrypted encoded data portions to the plurality of servers; and wherein each server of the plurality of servers is configured to:

receive at least one encrypted encoded data portion from the client device;

evaluate a function using the received at least one encrypted encoded data portion to calculate an encrypted encoded result, wherein the at least one encrypted encoded data portion received by the server is from at least one of the first and second sets of encrypted encoded data portions; and send the encrypted encoded result to the client device; and wherein the client device further includes means for:

receiving a plurality of encrypted encoded results from at least a subset of servers of the plurality of servers;

decrypting the received plurality of encrypted encoded results using a secret key according to the approximate FHE scheme to derive a plurality of decrypted encoded results; and decoding the plurality of decrypted encoded results using an approximate decoding function.

18. The system of claim 17, wherein each server of the plurality of servers is further configured to perform at least one matrix or vector arithmetic operation using the received at least one encrypted encoded data portion.

19. The system of claim 17, wherein the client device further includes means for determining a total number of encoded data portions to be derived from encoding at least 5 one of the first dataset and the second dataset based at least in part on a degree of the function to be evaluated by each server of the plurality of servers to calculate the encrypted encoded result.

20. The system of claim 17, wherein the client device 10 further includes means for:

dividing the first dataset into a first set of smaller datasets;

dividing the second dataset into a second set of smaller datasets;

encoding the first set of smaller datasets to generate the 15 first set of encoded data portions; and encoding the second set of smaller datasets to generate the second set of encoded data portions.

\*  \*  \*  \*  \*